United States Patent [19]
Bakkila et al.

[11] Patent Number: 5,358,097

[45] Date of Patent: * Oct. 25, 1994

[54] ACCUMULATION CONVEYOR WITH RETRACTABLE SENSOR

[75] Inventors: Douglas J. Bakkila; Samuel J. DeMan, both of Grand Rapids; David H. Cotter, Coopersville; Bernard H. Woltjer, Jenison; Arthur J. Terpstra, Jr., Allendale, all of Mich.

[73] Assignee: Rapistan Demag Corporation, Grand Rapids, Mich.

[*] Notice: The portion of the term of this patent subsequent to Mar. 9, 2010 has been disclaimed.

[21] Appl. No.: 26,856

[22] Filed: Mar. 5, 1993

Related U.S. Application Data

[63] Continuation-in-part of Ser. No. 605,544, Oct. 30, 1990, Pat. No. 5,191,967.

[51] Int. Cl.$^5$ .............................................. B65G 13/06
[52] U.S. Cl. ................................... 198/781; 198/783
[58] Field of Search ............ 198/460, 781, 782, 783, 198/789, 790

[56] References Cited

U.S. PATENT DOCUMENTS

| | | | |
|---|---|---|---|
| 3,420,355 | 1/1969 | DeGood et al. | |
| 3,612,248 | 10/1971 | Wallis | 198/781 |
| 3,724,642 | 4/1973 | DeGood | 198/781 |
| 3,730,330 | 5/1973 | DeGood | 198/781 |
| 3,768,630 | 10/1973 | Inwood et al. | 198/781 |
| 3,770,102 | 11/1973 | DeGood | 198/781 |

(List continued on next page.)

FOREIGN PATENT DOCUMENTS 384003B 9/1987 Austria.

(List continued on next page.)

OTHER PUBLICATIONS

English language translation of German Patent Document 34 43 944 C1.

(List continued on next page.)

Primary Examiner—D. Glenn Dayoan
Assistant Examiner—Tuan N. Nguyen
Attorney, Agent, or Firm—Price, Heneveld, Cooper, DeWitt & Litton

[57] ABSTRACT

A pneumatic accumulation conveyor has an anti-singulation control capable of deactivating the drive of a zone if the product sensor for that zone and substantially all of the product sensors downstream of that zone sense the presence of product in order to produce an accumulation portion with no zones actuated and is capable of activating the drive of a zone if any of the drives downstream of the associated zone are actuated in order to produce a transport portion in which all zones upstream of any actuated drive are actuated to transport product without singulation of any upstream grouped product. The accumulation conveyor is controlled by retractable product sensors positioned at particular locations along the product conveyor in order to sense the presence of product at the particular locations. Each of the product sensors includes an arm that is selectively positioned in the path of the product being conveyed by the product conveyor, a switch having an actuation member juxtaposed with the arm and a force-producing connection from a drive actuator of a downstream zone in order to move the arm from a position in the path of the product being conveyed to a retracted position. A mode control is provided for selecting one of first, second and third modes. In a first mode, the control actuates a discharge conveyor section and causes all sensors to be retracted from their sensing position to provide a slug discharge mode in order to clear out accumulated product without singulation. In a second mode, the control actuates the discharge conveyor but extends one group of sensors to a sensing position. This provides singulation between packages at the location of the sensor rollers to provide a singulation discharge mode in which gaps are drawn between packages. In a third mode, the discharge conveyor is deactuated and all sensors are allowed to be in their extended position in order to accumulate product.

13 Claims, 10 Drawing Sheets

U.S. PATENT DOCUMENTS

| | | |
|---|---|---|
| 3,960,262 | 6/1976 | Henig .................................. 198/781 X |
| 3,967,718 | 7/1976 | Monahan ........................ 198/781 X |
| 4,109,783 | 8/1978 | Vogt ...................................... 198/781 |
| 4,174,777 | 11/1979 | Riehle ................................ 198/781 |
| 4,219,115 | 8/1980 | Moore ................................. 198/781 |
| 4,264,004 | 4/1981 | Harwick ............................. 198/781 |
| 4,273,239 | 6/1981 | Thwaites et al. ................. 198/781 |
| 4,383,605 | 5/1983 | Harwick ............................. 198/781 |
| 4,441,607 | 4/1984 | Bowman et al. ................. 198/781 |
| 4,534,462 | 8/1985 | Hoover et al. .................... 198/781 |
| 4,562,920 | 1/1986 | Jaffre ................................. 198/781 |
| 4,609,098 | 9/1986 | Morgan et al. ................... 198/781 |
| 4,721,203 | 1/1988 | Kimball et al. ................... 198/781 |
| 4,817,784 | 4/1989 | Judge ................................. 198/781 |
| 4,819,788 | 4/1989 | Van Der Schie ................. 198/781 |
| 4,919,255 | 4/1990 | Morgan et al. ................... 198/781 |
| 5,016,748 | 5/1991 | Garzelloni ........................ 198/781 |
| 5,042,644 | 8/1991 | Davis ................................. 198/781 |
| 5,058,727 | 10/1991 | Jahns et al. ....................... 198/460 |
| 5,060,785 | 10/1991 | Garrity ............................... 198/781 |
| 5,191,967 | 3/1993 | Woltjer et al. .................... 198/781 |

FOREIGN PATENT DOCUMENTS

| | | |
|---|---|---|
| 0508532 | 10/1992 | European Pat. Off. ............ 198/781 |
| 3443944 | 5/1986 | Fed. Rep. of Germany . |
| 7221063 | 6/1973 | France . |
| 2312428 | 12/1976 | France ................................. 198/781 |
| 7908787 | 12/1979 | Netherlands . |
| B65G4726 | 2/1983 | PCT Int'l Appl. . |
| WO9301113 | 1/1993 | PCT Int'l Appl. . |

OTHER PUBLICATIONS

English language translation of Netherlands Patent Disclosure 7,908,787.

English language translation of Abstract of Austrian Patent Document 384,003 B.

European Search Report EP 91 30 9972.

ACCUMULATION CONVEYOR WITH RETRACTABLE SENSOR

CROSS-REFERENCE TO RELATED APPLICATIONS

This application is a continuation-in-part of U.S. patent application Ser. No. 07/605,544 filed Oct. 30, 1990, now issued as U.S. Pat. No. 5,191,967.

BACKGROUND OF THE INVENTION

This invention relates to accumulation conveyors and, more particularly, to pneumatically controlled accumulation conveyors. The invention is especially useful with high-speed conveyor systems.

In commonly owned U.S. Pat. No. 5,191,967, entitled CONVEYOR SYSTEM HAVING NON-SINGULATING ACCUMULATION CONVEYOR, a pneumatically controlled accumulation conveyor is disclosed which is intended, in part, to overcome problems associated with the accumulation conveyor disclosed in U.S. Pat. No. 3,768,630 issued to Russell A. Inwood et al. for an ACCUMULATOR WITH CONVEYOR OVERRIDE. Inwood et al. provide a series of tandem conveyor zones which are each responsive to actuation of the downstream zones in order to actuate that zone if any downstream zone is being actuated. In an accumulation mode, a case stop is raised and cases accumulate behind the stop to the point of actuating a sensing roller to deactivate an associated zone in order to keep articles closely spaced. However, it accomplishes this result using a shuttle valve associated with each zone, which receives its operating pressure in the appropriate circumstances from a series path extending through one or several downstream shuttle valves. During a clear-out mode, all zones are actuated through such series path. The result is a sluggish response to changes in operating states.

U.S. Pat. No. 5,191,967 overcomes this problem by providing an anti-singulation control which deactivates the driving means of an associated zone if the product sensing means for that zone and all of the product sensing means downstream of that zone sense the presence of product in order to produce an accumulation portion in which no zones are actuated. The control activates the drive means of an associated zone if any of the zones downstream of the associated zone are activated in order to produce a transport portion in which all zones upstream of any actuated zone are actuated to transport product without singulation of any upstream grouped product. The driving means for each zone is connected directly to a source of actuating fluid in order to actuate the drive means directly from the source. This provides an increase in product throughput by avoiding singulation between groups of moving packages in an exceptionally responsive manner because actuation through a series of shuttle valves is avoided. Such control may be embodied in first and second pneumatic devices at each sensing roller. The first pneumatic device responds to product actuating the sensing roller associated with that zone in order to connect the drive means of that zone directly with a source of actuating fluid. The second pneumatic device responds to actuation of the drive means of the downstream zone in order to connect the drive means of the controlled zone directly with a source of actuation fluid irrespective of whether any product is actuating the sensing roller associated with that zone.

In a subsequent development by another, such direct connection with a source of actuating fluid is accomplished in the same manner by attaching a pneumatic solenoid, or cylinder, to the arm of the sensing roller of the controlled zone and actuating the solenoid from the air diaphragm which actuates the drive means of the zone downstream of the controlled zone. With the pneumatic solenoid operatively positioned to engage the sensor valve for the controlled zone, the precise same operation as set forth in the U.S. Pat. No. 5,191,967 is accomplished. When any product sensing roller downstream of a zone does not sense the presence of a product, its sensor valve actuates the air diaphragms in order to drive that zone. This, in turn, actuates the solenoid of the upstream zone which retracts the sensing roller and actuates the sensor valve for that zone which drives the upstream zone. This operation cascades upstream in order to retract the sensor rollers for all zones upstream of a zone that do not sense the presence of product in that zone.

While such retractable sensor pneumatic control scheme is a convenient manner to implement the principles of the invention of the U.S. Pat. No. 5,191,967, it is not without its drawbacks. The mounting of the pneumatic solenoid on the movable arm of the sensor roller is a difficult mounting arrangement, both mechanically and pneumatically, because of the requirement that pneumatic lines be plumbed to a movable member. Furthermore, field retrofit is difficult and time-consuming. An additional difficulty is that packages may have bottom surfaces that are somewhat chamfered or otherwise damaged which creates the possibility that a package in a line of packages accumulating on the accumulation conveyor may not properly actuate a sensing roller. If this occurs, or if a pneumatic solenoid or sensing valve malfunctions, the driving means of all zones upstream of the zone having the malfunction will continue to be actuated resulting in an unacceptable increase in product line pressure.

SUMMARY OF THE INVENTION

The present invention is embodied in a multiple mode accumulation conveyor having an anti-singulation control capable of deactivating the drive means of a zone if the product sensing means for that zone and substantially all of the product sensing means downstream of that zone sense the presence of product in order to produce an accumulation portion in which no zones are actuated. The control is further capable of activating the drive means of a zone if any of the drive means downstream of the associated zone are actuated in order to produce a transport portion in which all zones upstream of any actuated drive means are actuated to transport product without singulation of any upstream grouped product.

According to a first aspect of the invention, a guardian control is provided in order to reduce the buildup of product on actuated zones resulting from the failure of one of the product sensing means to fail to respond to the presence of a product in a particular zone. This guardian control may include independent pneumatic controls associated with particular zones dispersed along the accumulation conveyor. Each independent control is capable of deactivating the drive means of that zone if the sensing means for that zone senses the presence of product, irrespective of the condition of any downstream zone.

According to another aspect of the invention, an accumulation conveyor has retractable product sensors positioned at particular locations along product conveyors in order to sense the presence of product at the particular locations. Each of the product sensors includes an arm that is selectively positioned in the path of product being conveyed by the product conveyors, a switch having an actuation member juxtaposed with the arm and a force-producing connection from an actuator of a downstream zone, in order to move the arm from a position in the path of product being conveyed to a retracted position. The force-producing connection includes the switch being positioned in a line of force between the downstream zone actuator and the arm whereby product on the accumulation conveyor causes the arm to actuate the switch when the arm is positioned in the path of product being conveyed. The force-producing connection may include a solenoid, or cylinder or mechanical line, that is responsive to actuation of the downstream zone actuator in order to apply a force to the switch. The solenoid and switch may both be mounted to the frame thus freeing the arm of any plumbed attachments. Additionally, the switch and solenoid may be combined in a unitary package that is readily adaptable to field upgrade of existing accumulation conveyors.

Another aspect of the invention is embodied in an accumulation conveyor having a plurality of conveyor sections arranged in tandem whereby each of the conveyor sections is selectively actuatable in order to convey product to another section and is deactuatable in order to accumulate product on that section. A product sensor is associated with each of the conveyor sections in order to sense the presence of product on the associated conveyor section and to deactivate that conveyor section. Particular ones of the product sensors include retractors that are responsive to actuation of at least one of the conveyor sections that is downstream of the conveyor section associated with that sensor in order to retract that sensor from a sensing position. Other particular ones of such product sensors remain in the sensing position irrespective of whether any conveyor section downstream of the conveyor section associated with that sensor is actuated. By interspersing such product sensors that do not respond to the action of downstream conveyor sections throughout the accumulation conveyor, a guardian system is provided to avoid excessive build-up of line pressure as a result of malformed package bottoms or malfunctioning of downstream sensing valves or retracting solenoids. Any such build-up of line pressure will terminate when the slug of product accumulates to the closet guardian sensor roller.

Such guardian sensor rollers, according to another aspect of the invention, may themselves be retractable irrespective of the activity of the downstream conveyor sections. A control may be provided for selecting one of first, second and third modes. In a first mode, the control actuates the most downstream of the conveyor sections, which will cause the upstream zones to be driven. In this mode, the control will cause the guardian sensor rollers to be retracted from their sensing position. The anti-singulation feature of the control responds, accordingly, by driving all of the conveyor sections. This provides either a transportation mode or a slug discharge mode in order to clear out accumulated product without singulation. In a second mode, the control actuates the most downstream of the conveyor sections but does not retract the guardian sensor rollers. With the guardian sensor rollers in their sensing position, the accumulation conveyor will singulate between packages at the location of such guardian sensor rollers. This provides a singulation discharge mode in which gaps are drawn between packages. In a third mode, the control deactivates the most downstream of the conveyor section and does not retract the guardian sensor rollers. This is an accumulation mode in which the product will accumulate behind the most downstream conveyor section with the guardian sensor rollers providing protection against malformed carton bottoms and other malfunctions.

By providing three modes, optimum system throughput may be obtained consistent with efficient and reliable accumulation of packages when such function is desired. When the accumulation conveyor is placed into a transport mode or a slug discharge mode, transport of packages occurs with no singulation between packages. During the accumulation mode, singulation of packages is kept to a minimum. However, a singulation feature is available in order to provide spacing between packages when desired.

These and other objects, advantages and features of this invention will become apparent upon review of the following specification in conjunction with the drawings.

DESCRIPTION OF THE PREFERRED EMBODIMENT

Figure 1:
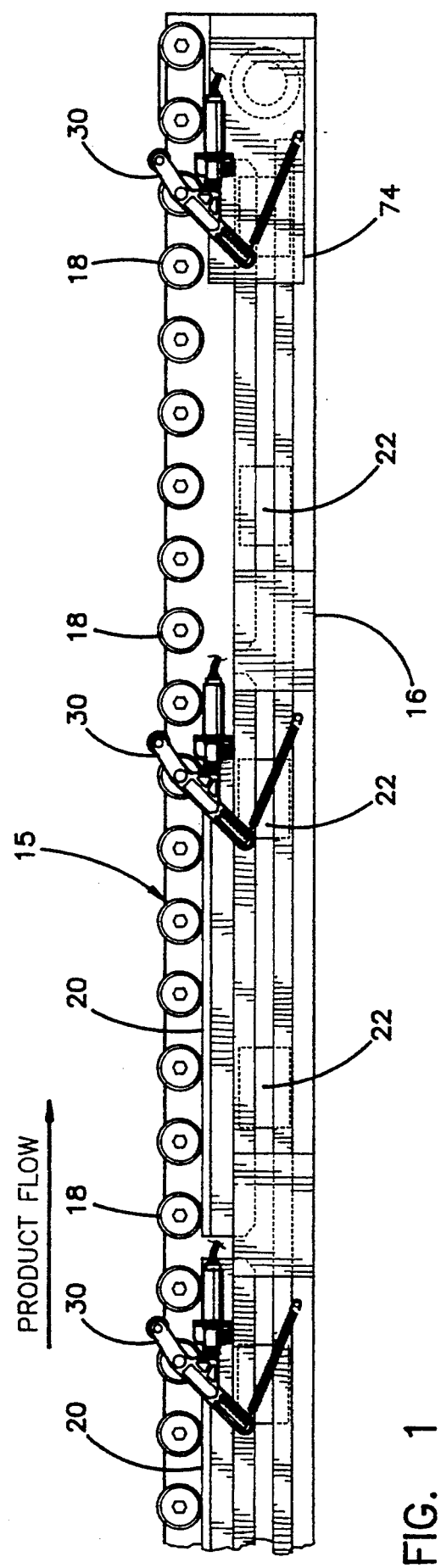
FIG. 1 is a sectioned side elevation illustrating a portion of an accumulation conveyor according to the invention.
Figure 5:
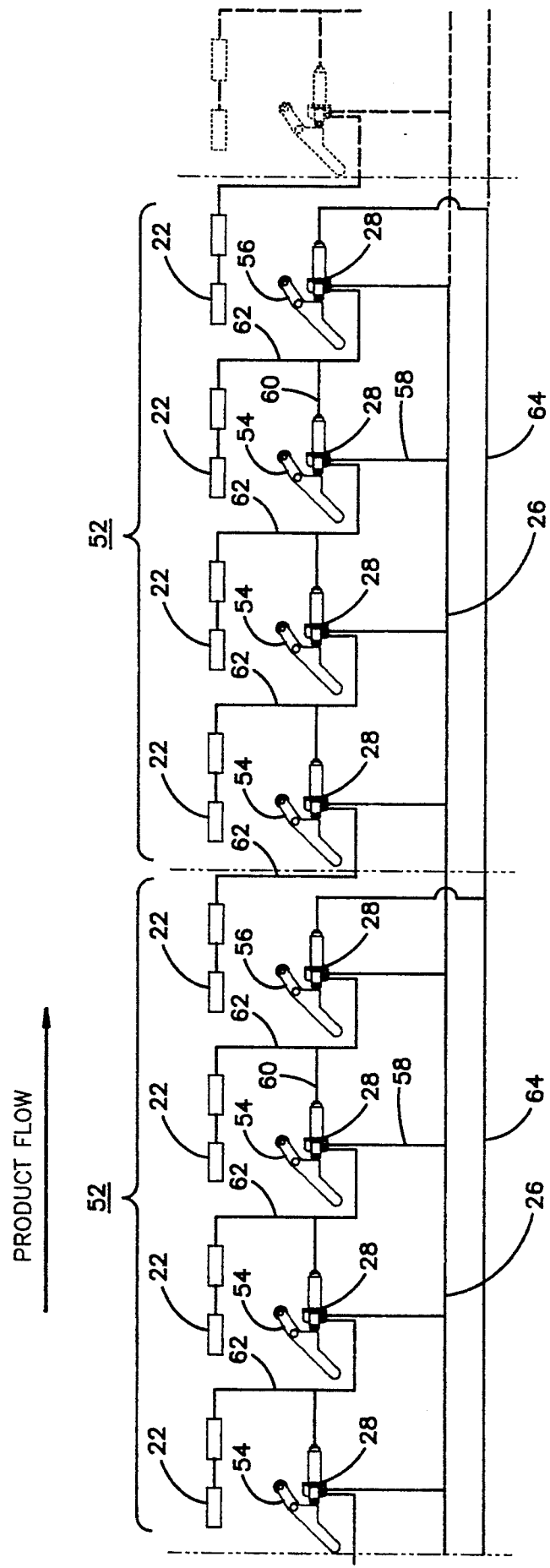
FIG. 5 is a pneumatic schematic diagram of an accumulation conveyor bed according to the invention.

Referring now specifically to the drawings and the illustrative embodiments depicted herein, an accumulation conveyor 15 includes a frame 16 supporting a multiplicity of rotatable rollers 18 and a plurality of drive means 20, such as continuously rotatable chains, belts, bands or other such means, that are actuatable by actuation means, such as pneumatic air bags 22, in order to power rollers 18 to convey product, such as packages 24, from left-to-right, as viewed in FIG. 1. Rollers 18 are divided into zones, each zone driven by a particular drive 20. The air bags, or actuation means, for each drive are actuated from a source of compressed air 26 (FIGS. 5 and 6) through a pneumatic control 28. Pneumatic control 28 is responsive, in part, to a product sensor 30 positioned immediately downstream, with respect to product flow, of the rollers making up the zone that is controlled by that product sensor so that the rollers making up the zone controlled by a particular pneumatic control 28 are positioned upstream of that control. As will be set forth in more detail below, in most zones, pneumatic control 28 for each actuation means 22 is additionally responsive to the actuation means immediately downstream of that zone. In this manner, each such interdependent pneumatic control is responsive to actuation of the drive downstream of the associated zone in order to actuate the drive of the associated zone if any of the drives downstream of the associated zone are actuated. This produces a transport portion of accumulation conveyor 15 in which all drives upstream of any driven zone are actuated in order to transport product without singulation of any upstream grouped products. The pneumatic control 28 deactivates the drive of its associated zone if product sensor 30 for that zone senses the presence of product and all of the drives downstream of that zone are deactivated. This produces an accumulation portion in which no drives are being actuated. In this manner, an interface between zones that are in the accumulation portion and zones that are in the transport portion is dynamically shifting in response to product movement along the accumulation conveyor 15 in order to provide product accumulation without singulation of groups of upstream product, as is set forth in more detail in U.S. Pat. No. 5,191,967 issued to Bernard H. Woltjer et al. for a CONVEYOR SYSTEM HAVING NON-SINGULATING ACCUMULATION CONVEYOR, the disclosure of which is hereby incorporated herein by reference.

Figure 2:
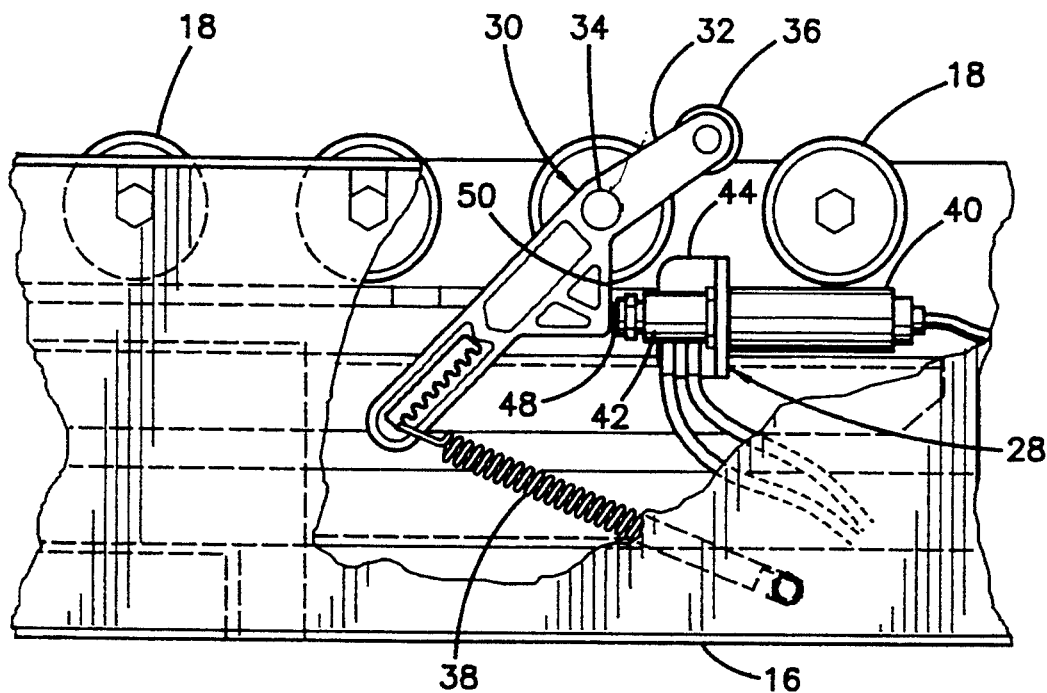
FIG. 2 is an enlarged side elevation of a product sensor according to the invention.
Figure 3:
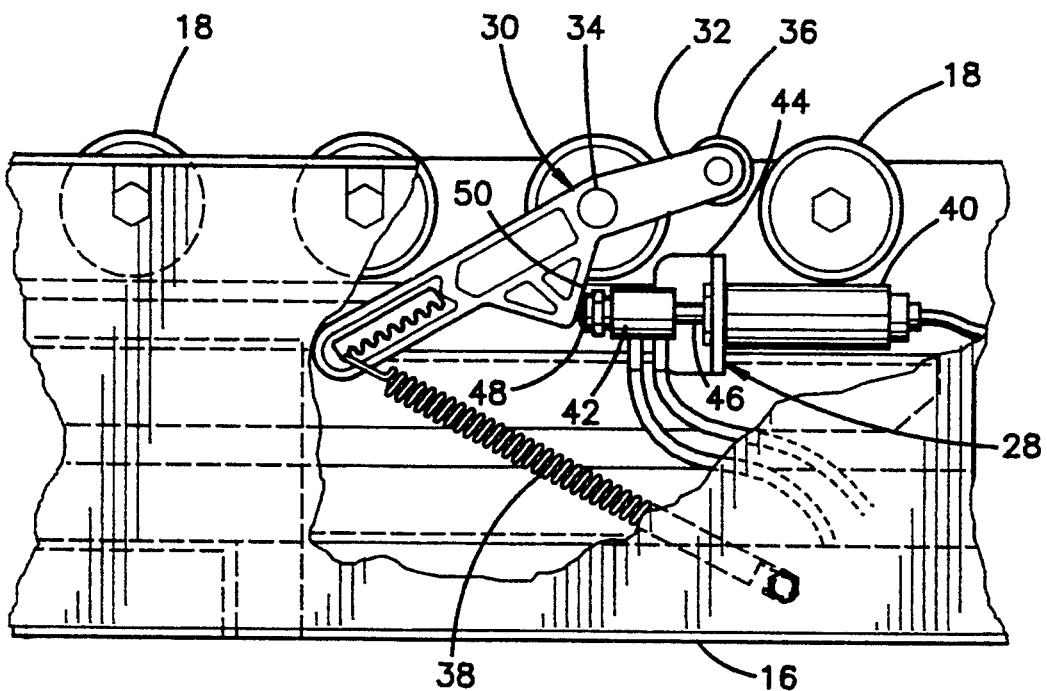
FIG. 3 is the same view as FIG. 2 in a different control state.

Each product sensor 30 includes an actuator arm 32 that is pivoted at 34 in order to move a sensing roller 36, that is rotatably mounted on actuator arm 32, between a product sensing position, as illustrated in FIG. 2, and a retracted position, as illustrated in FIG. 3. A spring 38 affixed at one end to frame 16 biases actuator arm 32 into a product sensing position. Product sensor 30 additionally includes a pneumatic control module 28 composed of a pneumatic solenoid, or cylinder, 40, and a valve 42 commonly mounted to a flanged bracket 44. Solenoid 40 is fixedly mounted to bracket 44 which is, in turn, fixedly mounted to frame 16. Valve 42 is mounted to a movable member 46 of solenoid 40, which extends in response to actuation of solenoid 40. In particular, with solenoid 40 deactuated, valve 42 is in the position illustrated in FIGS. 2 and 4 abutting the upstanding flange portion of bracket 44. When solenoid 40 is actuated, valve 42 is reciprocated away from bracket 44 as illustrated in FIG. 3. Valve 42 includes an actuator 48 which engages an extension portion 50 of actuator arm 32.

Figure 4:
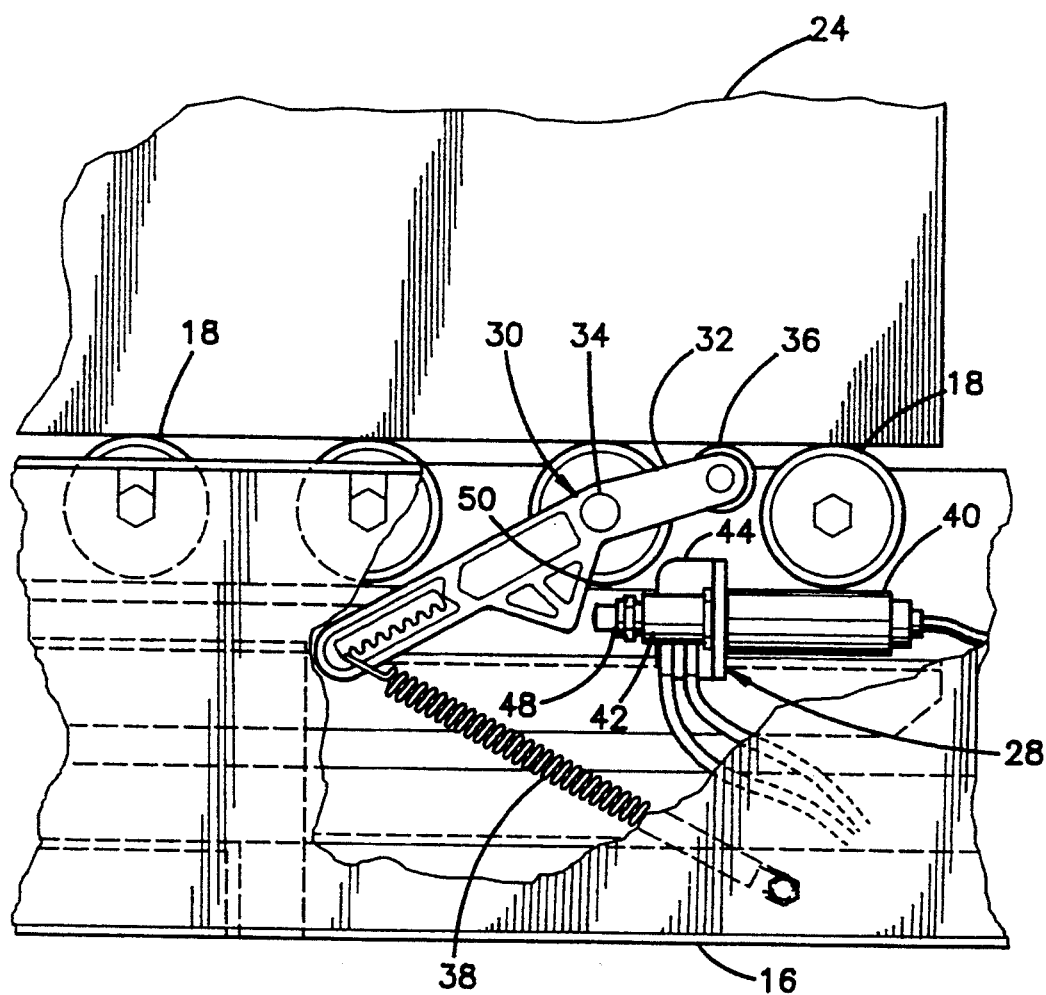
FIG. 4 is the same as FIG. 2 except in yet a different control state.

As may be seen by comparing FIGS. 2, 3 and 4, solenoid 40 is actuatable in order to produce a force responsive to actuation of the zone downstream of the zone controlled by the pneumatic control 28 incorporating that solenoid 40. Solenoid 40 produces such force in order to retract sensing roller 36 from the sensing position illustrated in FIG. 2 to the retracted position illustrated in FIG. 3. When the solenoid 40 is deactuated and no product is engaging sensor roller 36, valve 42 is being actuated by the force of spring 38 upon actuator arm 32. In such extended sensing position, product sensor 30 will respond to the presence of a package 24 by deactuating valve 42, as seen in FIG. 4. When solenoid 40 is actuated, as seen in FIG. 3, actuator arm 32 is pivoted to a retracted position by way of the movement of valve 42 under the force exerted by solenoid 40. Because valve 42 is thrust against actuator arm 32 in order to pivot the arm, valve 42 is concurrently actuated in the sensor retracted position illustrated in FIG. 3. Although the force-producing connection from the actuator 22 of the downstream zone in order to retract sensing roller 36 is illustrated as a pneumatic solenoid, other connections are possible. Alternatives may include an electrically actuated solenoid or a mechanical linkage.

Product sensors 30 are organized in a conveyor bed 52 into interdependent sensors 54 and guardian sensors 56. Each interdependent sensor 54 includes a first input 58 connected directly with source of compressed air 26 and a second input 60 connected with a line 62, which is outputted from the downstream product sensor 30. Line 62 extends from a product sensor 30 to the actuating means 22 of the zone associated with that product sensor. Line 62 is selectively pressurized by valve 42 in order to actuate the actuator means 22 of the downstream zone and causes the associated drive to rotate the rollers in the downstream zone. Valve 42 is pneumatically in series between input 58 and line 62 in order to interconnect the two lines when the valve is being actuated by depressing its actuator 48. Valve 42 interconnects line 62 with atmosphere when valve 42 is not actuated. The actuation port of solenoid 40 for each interdependent product sensor 54 is pneumatically connected to receive the second input 60 for that sensor. In this manner, solenoid 40 associated with each interdependent sensor 54, is actuated whenever the actuating means of the zone downstream of that controlled by that sensor 54 is actuated. Because the actuation of solenoid 40 results in actuation of valve 42 on its product sensor, as seen in FIG. 3, the pneumatic control 28 associated with a particular zone will actuate the drive of that zone if the downstream zone is being actuated. Because each such zone is, in turn, interdependent on the zone downstream of it, any interdependent sensor 54, which does not sense the presence of product in its zone, will cause all contiguous upstream zones thereof controlled by interdependent sensors 54 to be actuated.

Input 60 to solenoid 40 of each guardian sensor 56 is connected with a line 64. As will be set forth in more detail below, line 64 is selectively pressurized. When line 64 is pressurized, the solenoids 40 of the guardian sensors 56 will all be actuated which will retract the actuator arms 32 of the associated product sensors 30 as illustrated in FIG. 3. Conversely, when line 64 is depressurized, the actuators of all guardian sensors 56 will be deactuated which will cause the associated actuator arms 32 to be in an extended, product sensing position as illustrated in FIG. 2. Thus, whenever line 64 is depressurized, each guardian sensor 56 is in a product sensing position irrespective of the condition of any adjacent product sensor 30 or associated actuation means 22. When in such product sensing position, engagement of a guardian sensor 56 by a package will de, actuate the valve 42 of the associated pneumatic control and cause the drive from line 62 to be depressurized to remove drive from that zone. Although each guardian sensor 56 functions irrespective of upstream drives, the interdependent sensor 54 associated with the zone immediately upstream of a guardian sensor will respond to the presence or absence of pressure in line 62 extending from the guardian sensor and, hence, the actuation state of the drive associated with the guardian sensor in the same manner that it would respond to another interdependent sensor 54.

Guardian sensors 56 provide the useful function of guarding against damaging line pressure build-up should a carton fail to adequately actuate a product sensor 30. Such condition may occur if a carton has a damaged bottom surface, or even a severely chamfered bottom surface, or if a valve 42 or solenoid 40 malfunctions. This guardian function is accomplished by deactuating the mechanical drive of the zone controlled by the guardian sensor irrespective of the condition of any downstream zone. Without guardian sensors 56, if a sensing malfunction should occur, all zones upstream of the malfunction would be actuated, applying pressure to the packages in the que. Because it is not uncommon for such accumulation conveyors to be arranged in extreme lengths by combining a large number of conveyor beds 52 in tandem, such line pressure could be excessive and result in a product pile-up. Because, whenever line 64 is depressurized, guardian sensors 56 are in a product sensing position and operate to deactuate the drive of the zone controlled therewith irrespective of the condition of any downstream zone, any build-up of line pressure will not extend beyond the next guardian sensor.

Figure 6:
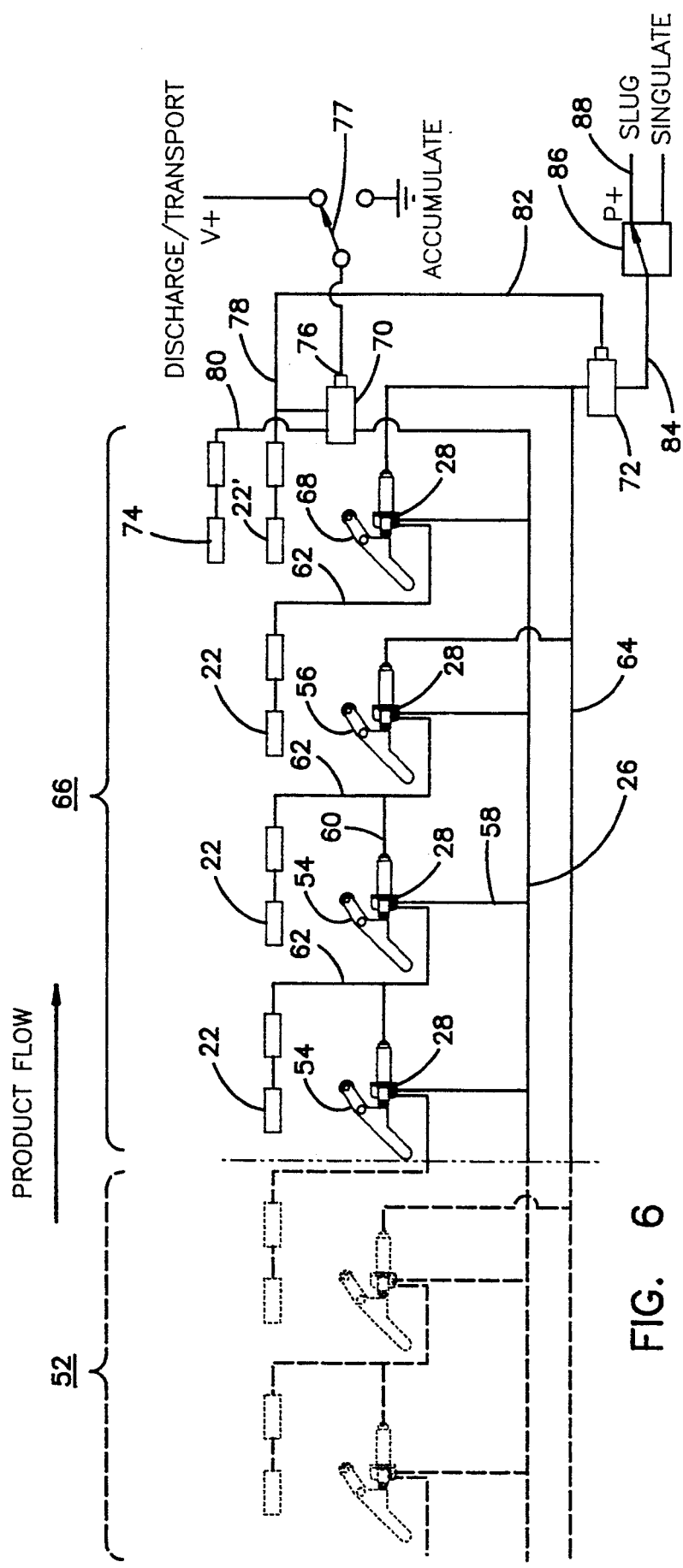
FIG. 6 is a pneumatic schematic diagram of another embodiment of the invention.

In particular applications, such as where it is desired to be able to provide accumulation of product behind a vertical stop, or a zone having a braked high friction drive surface, followed by slug discharge of accumulated packages, a discharge bed 66 may be used in combination with one or more intermediate conveyor beds 52 (FIG. 6). Such application may be, for example, at a merge area upstream of a sortation subsystem. Discharge bed 66 includes a plurality of interdependent sensors 54, a guardian sensor 56 and a discharge sensor 68. Discharge sensor 68 is plumbed the same as guardian sensors 56 so that it is in a product sensing position whenever line 64 is depressurized. Guardian sensor 56 in discharge bed 66 provides protection in case of malfunction of discharge sensor 68. Discharge bed 66 further includes a four-way electrical-solenoid actuated pneumatic valve 70 and a pneumatically actuated three-way pneumatic valve 72. Discharge bed 66 additionally includes the most downstream actuating member 22' and a pneumatically actuated roller brake 74 located with discharge sensor 68 at a discharge zone. Valve 70 is selectively actuated by application of a voltage to its electrical solenoid at 76 by an electrical switch 77. With an actuating voltage applied to an input 76 of valve 70, drive 22' is connected with compressed air line 26 through a line 78 and a line 80 to brake 74 is connected with atmosphere, in order to drive the discharge zone. When the actuating voltage is removed from input 76, solenoid valve 70 removes pressure from line 78 and switches line 80, extending to brake 74, into engagement with compressed air line 26 in order to brake the discharge zone.

Line 78 additionally extends to an actuator input 82 for pneumatically actuated valve 72. When line 82 is pressurized, by being interconnected with compressed air line 26 through valve 70, valve 72 interconnects line 64 with an air supply line 84. When line 82 is depressurized, valve 72 interconnects line 64 with atmosphere thus depressurizing line 64. Line 84, in turn, is connected with a pressure switch 86 which may be placed in a first position connecting supply line 84 with a source of compressed air at 88 and a second position connecting supply line 84 with atmosphere. Thus, line 64 will be depressurized whenever discharge bed 66 is in an accumulate mode, by moving switch 77 to an accumulate position in order to remove voltage from input 76 of valve 70. This causes valve 70 to apply pressure to brake 74 and remove pressure from line 78 and actuating means 22' and line 64 to sensors. This causes valve 72 to deactuate, which connects line 64 with atmosphere, which deactuates the solenoids 40 associated with guardian sensors 56 thereby extending sensors into a sensing position, as illustrated in FIG. 2. Line 64 is also depressurized whenever switch 86 is in a singulate position disconnected from source 88. When, however, switch 77 is in the discharge/transport position, actuating valve 70 is actuated in order to apply pressure from line 26 to line 78, and when switch 86 is interconnecting supply line 84 -with source pressure 88, line 64 is pressurized. When line 64 is pressurized, the guardian sensors 56 are moved by their solenoids 40 to their retracted product sensing position as illustrated in FIG. 3.

Figure 8:
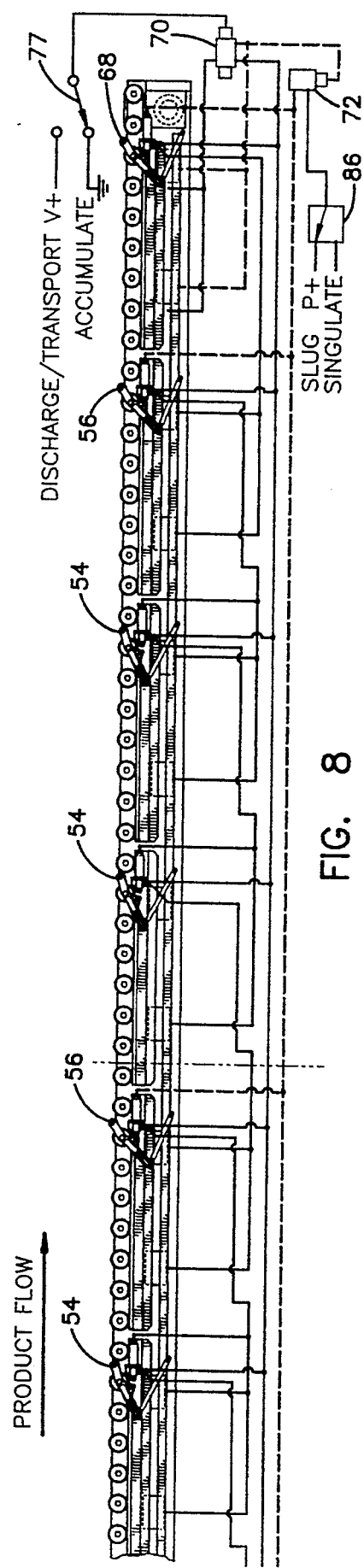
FIG. 8 is the same view as FIG. 7 of the accumulation conveyor in an accumulate mode.
Figure 9:
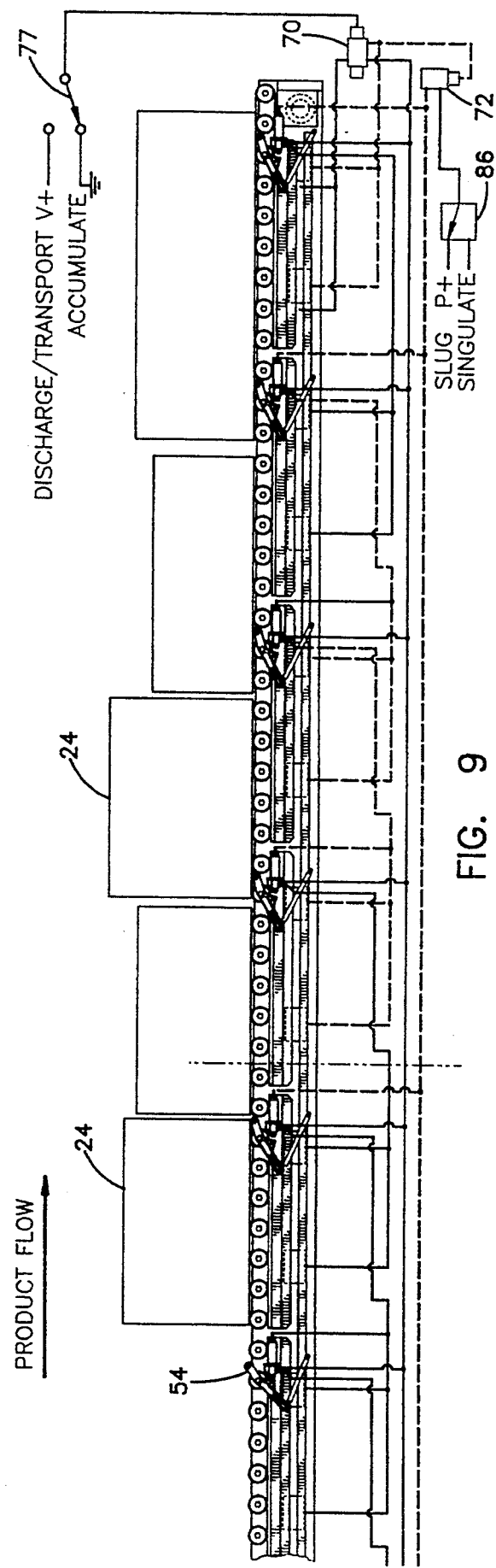
FIG. 9 is the same as FIG. 8 illustrating interaction with product or packages.

When valve 77 is in the accumulate position, brake 74 is applied, the actuating means 22' associated with the discharge zone is deactuated and guardian sensors 56 and discharge sensor 68 are extended (FIGS. 8 and 9). In this accumulate mode, the first package to arrive at the discharge zone actuates discharge sensor 68 which causes the next upstream zone to stop driving. As product arrives on the next upstream zone, controlled by a guardian sensor 56, that zone will stop driving. This will cause the first interdependent sensor 54 to be extended to a sensing position. When this extended first interdependent sensor 54 is actuated, the zone controlled thereby will be deactuated and the solenoid 40 associated with the next upstream interdependent sensor will be deactuated which will extend the next upstream interdependent sensor into the product sensing position illustrated in FIG. 2. This process will continue with the remaining interdependent upstream zones being actuated until a package is sensed by its associated interdependent sensor 54. Thus, it is seen that interdependent sensors 54 remain retracted in their retracted position out of the movement of packages along accumulation conveyor 15 until packages accumulate in the accumulate mode up to the next most downstream interdependent sensor. When that occurs, the upstream interdependent sensor is extended to the product sensing position illustrated in FIG. 2. This allows interdependent sensors 54 to be retracted in order to avoid product singulation and, thereby, increase the rate of product flow. This also reduces noise and wear from each sensor being actuated by every package being conveyed along accumulation conveyor 15. Any interdependent sensor is, however, extended to a sensing position when all downstream conveyor sections are deactuated and accumulating product. In the accumulate mode, line 64 is depressurized by solenoid valve 70 and, therefore, guardian sensors 56 will remain in their extended product sensing positions irrespective of the accumulation of product along accumulation conveyor 15 and irrespective of the position of pressure switch 86.

Figure 7:
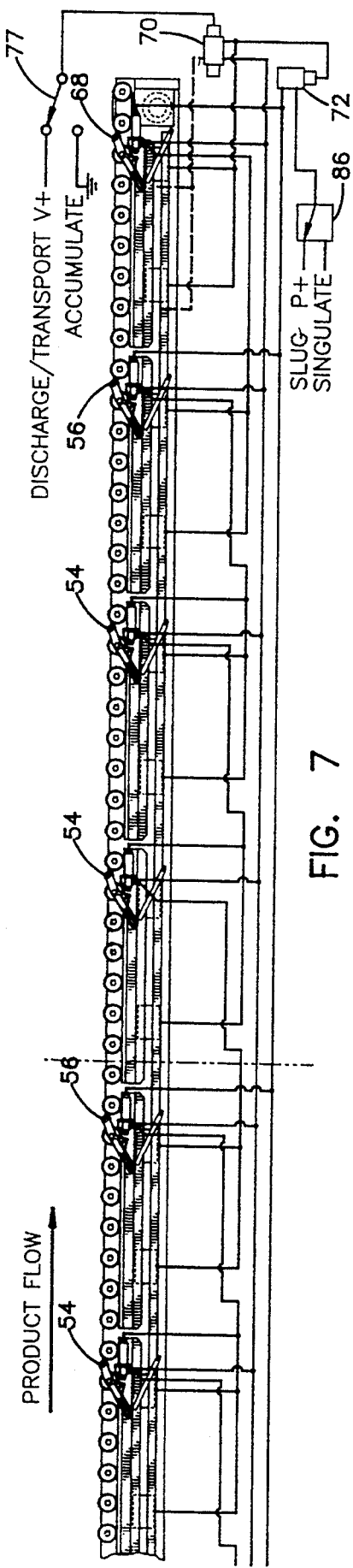
FIG. 7 is a combined side elevation and control layout illustrating an accumulation conveyor in a product discharge or product transport mode.

When it is desired to no longer accumulate product on accumulation conveyor 15, switch 77 is moved to the discharge/transport position which removes pressure from line 80 extending to brake 74 and applies this pressure to line 78 extending to actuating means 22'. This causes packages to begin moving off of accumulation conveyor 15. The actuation of line 78 will additionally cause pneumatic valve 72 to switch, which will apply pressure to line (>4, if valve 86 is in the slug discharge mode by interconnection with source 88. If so, positive pressure is applied to line 64 which causes discharge sensor 68, and all guardian sensors 56, to be retracted (FIG. 7). When each guardian sensor and discharge sensor is retracted, in this manner, its pneumatic control 28 actuates its drive and the interdependent sensor upstream thereof is caused to be retracted and its drive actuated because of the responsiveness of the solenoid to that upstream sensor. This continues upstream along the entire accumulation conveyor 15. Thus, in such slug discharge mode, all product sensors 30 are retracted and all conveyor zones are driven causing packages to be discharged, or transported across accumulation conveyor 15, without singulation between the packages.

Figure 10:
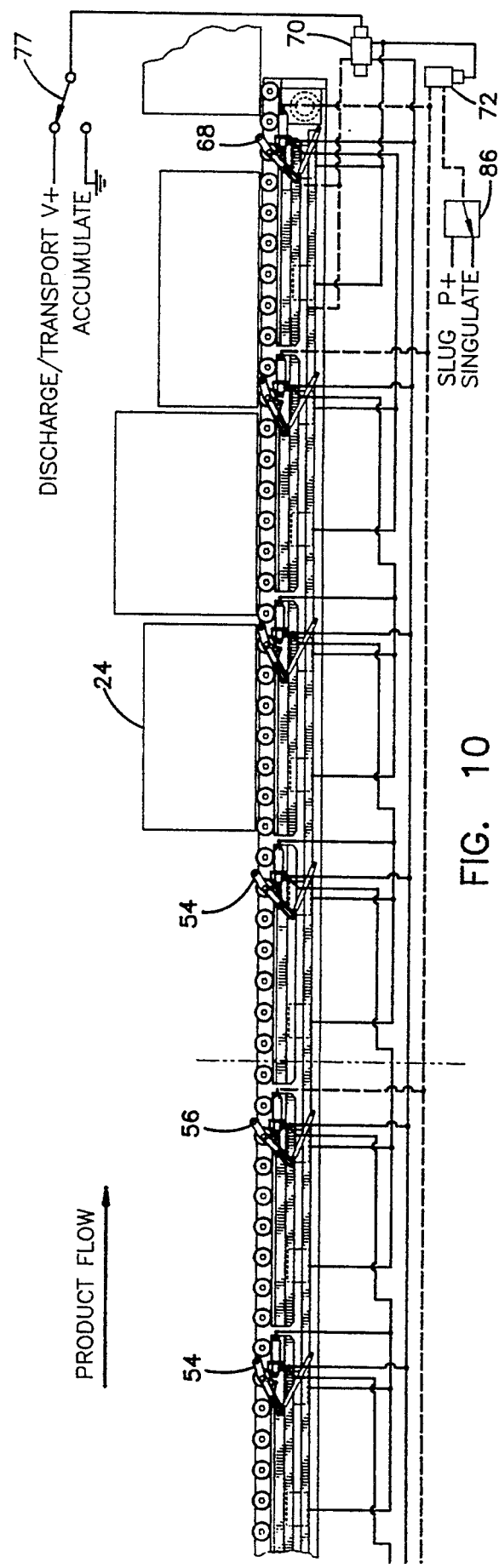
FIG. 10 is the same view as FIG. 7 with the accumulation conveyor in a singulation product discharge mode.
Figure 11:
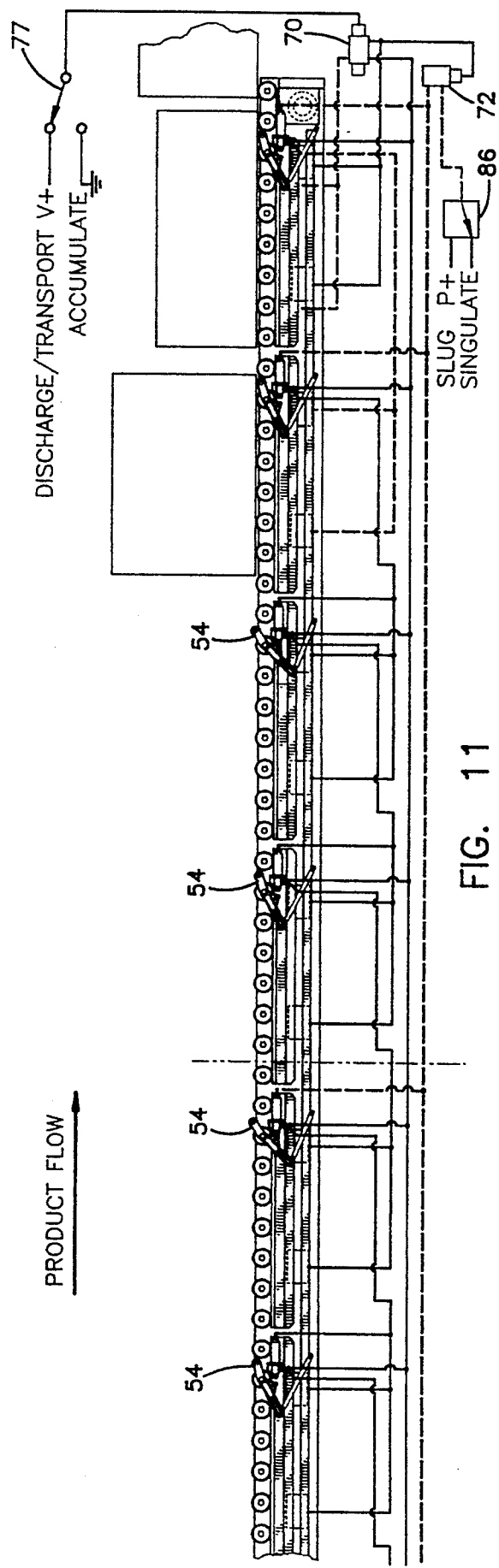
FIG. 11 is the same as FIG. 10 after movement of packages.

If pressure switch 86 is in the "singulate" mode, then line (64 will be depressurized at switch 86. This will cause discharge sensor 68 and all guardian sensors 56 to be extended in their product sensing position even if solenoid valve 70 is in the discharge mode (FIGS. 10 and 11). Thus, as a package reaches the discharge sensor 68 and each guardian sensor 56, the zone controlled thereby will be deactuated until that package moves off of the respective discharge sensor or guardian sensor. However, the independent sensors 54 will continue to transport product without singulation. The result is a singulation of packages at the discharge sensor and at each guardian sensor, which provides gaps between packages.

Figure 12:
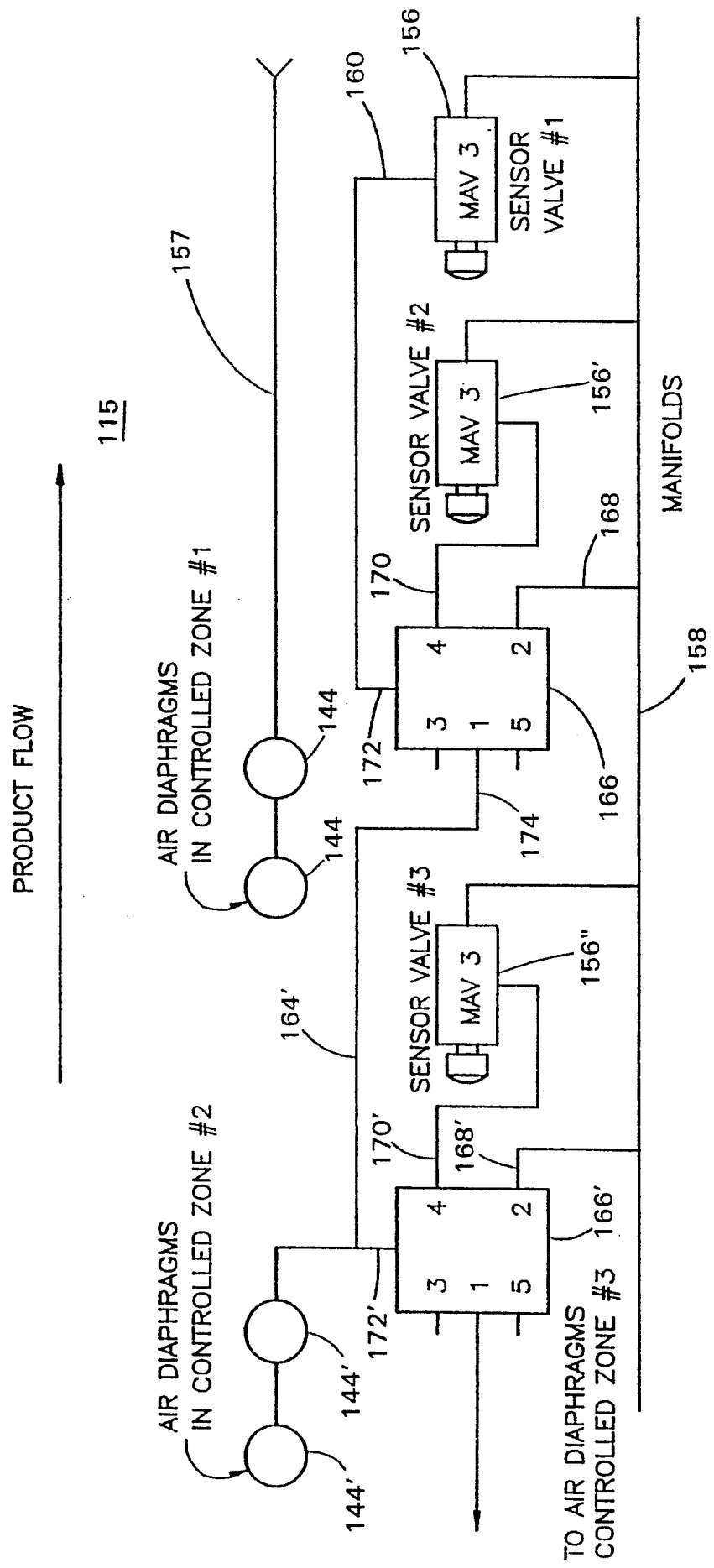
FIG. 12 is a pneumatic schematic diagram of an alternate embodiment of an accumulation conveyor according to the invention.

Another embodiment of an accumulation conveyor 115 capable of accumulating product without singulation of groups of upstream product is illustrated in FIG. 12. Pneumatic diaphragms 144 in zone 1, which is the most downstream zone of conveyor 115 and is adjacent to the discharge conveyor, is connected directly with a line 157 that is selectively supplied with compressed air whenever the discharge conveyor is activated. Accordingly, whenever the discharge conveyor is operating, the diaphragms 144 associated with zone 1 immediately upstream of the roller of zone 1 are energized to cause zone 1 rollers to be driven.

A sensor valve 156, associated with zone 1, is connected between a source of constant compressed air on a line 158 to a line 160. Zone 2, which is upstream of zone number 1, includes a pilot-controlled valve 166. Valve 166 includes a first inlet 168 connected with the constant air source of line 158 and a second inlet 170 connected with valve 156', associated with zone 2. A control, or pilot, input 172 of valve 166 is connected with line 160. Valve 166 additionally includes an output line 174. When pilot input 172 is supplied with compressed air from line 160, output 174 is connected with input 168, such that output 174 is continually pressurized irrespective of the condition of valve 156'. When input 172 is not pressurized because of the lack of compressed air on line 160, output line 174 is connected with input 170 such that output 174 is either pressurized or not pressurized depending upon the open or closed state of sensor valve 156'.

Accordingly, if line 160 is pressurized in response to zone 1 sensor valve 156 sensing the absence of product, output 174 from valve 166 is pressurized. If zone 1 sensor valve 156 senses a case on the sensing roller immediately adjacent the discharge conveyor, output 174 of valve 166 will be pressurized by sensor valve 156' if there is no case on the sensing roller for zone 2 but will not be pressurized if there is a case on the sensing roller for zone 2. Output 174 extends to the pneumatic diaphragms 144' for zone number 2, such that when output 174 is pressurized, diaphragms 144' are actuated which causes the rollers in zone 2 to be driven. Output 174 from valve 166 associated with zone 2 is additionally supplied as an input 172' to a valve 166' which is the pilot operated three-way valve associated with the air diaphragms for zone number 3 (not shown). Accordingly, if the diaphragms 144' for zone 2 are pressurized to drive the rollers in zone 2, the rollers in zone 3 will also be driven. If, however, the drive rollers in zone 2 are not being driven because line 164' is not pressurized, the drive rollers in zone 3 will be driven only if sensor valve 156" is open in response to the absence of product on the sensing roller associated with zone 3, and will not be driven if sensor valve 156" is closed in response to product actuating the sensing rollers for zone 3.

The above-described configuration of pilot operated valves and product sensing valves provided anti-singulation means. Thus, it may be seen that whenever any sensor roller downstream of a particular zone is not being actuated by a product case, the zone is actuated. If, however, all of the sensing rollers downstream of a particular zone are covered with cases, then the drive rollers for that zone will be driven if the sensing roller for that zone is uncovered but will be not driven if the sensing roller is covered. Thus, it may be seen that the drive rollers in any given zone will only be deactivated, in order to act as an accumulator, if there is essentially a continuous stream of product downstream of the particular zone. When, however, the drive rollers in a zone are activated, they receive activating pressure from source 158 either directly through pilot actuated valve 166 or through pilot actuated valve 166 and the associated sensor valve 156. There are never more than two valve movements between any air diaphragm 144, 144' and source 158. As a result, all actuation of diaphragms 144, 144' are "crisp" and not sluggish.

The present invention provides an accumulation conveyor which is adaptable to substantially any accumulation function. That function may be accumulation behind a stop with a slug discharge application, with or without singulation, as typically occurs upstream of a sortation subsystem. That function may also be a slug charge function as may occur downstream of the accumulation subsystem at a metering conveyor as described in U.S. Pat. No. 5,191,967. By providing a discharge conveyor having a unique combination of mode control devices, a suitable control scheme may be readily provided for the particular application. Furthermore, an accumulation conveyor system may be constructed of a multiple of conveyor beds assembled from standard sections in order to meet a particular application. An advantageous feature is that such control is accomplished with only a pneumatic air source and eliminates the requirements for electrical wiring throughout the conveyor sections. Furthermore, the invention provides for safe, reliable and reduced noise operation in a manner which may be readily retrofitted to existing field installations.

Changes and modifications in the specifically described embodiments can be carried out without departing from the principles of the invention, which is intended to be limited only by the scope of the appended claims, as interpreted according to principles of patent law including the Doctrine of Equivalents.

The embodiments of the invention in which an exclusive property or privilege is claimed are defined as follows:

1. An accumulation conveyor comprising:
    a multiplicity of conveying rollers for supporting product and being rotatable for conveying said product, said rollers being grouped in adjacent zones;
    an endless drive member juxtaposed with said rollers:
    a pneumatic actuator associated with each of said zones that is actuatable by actuating fluid in order to bring said drive member into contact with the rollers in that zone to rotate the rollers in that zone to drive product;
    a product sensor roller associated with each of said zones for sensing product in the vicinity of that zone;
    a pneumatic control associated with each of said zones for supplying actuating fluid to the actuator of that zone to actuate that actuator if the product sensor roller for that zone does not sense the presence of product;
    said pneumatic control further being responsive to actuation of the actuator of the zone downstream of that zone in the direction of product movement in order to supply actuating fluid to the actuator of that zone to actuate that actuator if any of said actuators downstream of that zone are actuated in order to produce a transport portion in which all zones upstream of any actuated actuators in the direction of product movement are actuated to transport product;
    wherein said pneumatic control withholds actuating fluid from the actuator of that zone to deactuate that actuator if said product sensor roller for that zone senses the presence of product and all of said actuators downstream of that zone are deactuated in order to produce an accumulation portion in which no actuators are actuated; and
    wherein each said pneumatic control connects the actuator of the zone associated with that pneumatic control with an actuating fluid manifold in order to actuate the actuator of the zone associated with that pneumatic control without the actuating fluid passing through a pneumatic control of another zone.

2. The conveyor system of claim 1 wherein said pneumatic control includes a first pneumatic device that responds to said sensor roller for that zone not sensing product in order to connect the mechanical driver of that zone with an actuating fluid manifold and a second pneumatic device that responds to actuation of the actuator of the zone downstream of that zone to connect the actuator of that zone with an actuating fluid manifold when the actuator of the zone downstream of that zone is actuated irrespective of whether said sensor roller for that zone is sensing product.

3. An accumulation conveyor comprising:
    a plurality of conveyor sections arranged in tandem, each of said conveyor sections being selectively actuatable in order to convey product to another section and deactuatable in order to accumulate product on that section;
    a product sensor associated with each of said conveyor sections and having a sensing position in which that product sensor will sense the presence of product on the associated conveyor section to deactuate that conveyor section;
    particular ones of said product sensors each including a retractor that is responsive to actuation of at least the one of said conveyor sections that is downstream of the conveyor section associated with that sensor in order to retract that sensor from said sensing position;
    other particular ones of said product sensors each including another retractor that is operative to retract that sensor from said sensing position irrespective of whether any conveyor section downstream of the conveyor section associated with that sensor is actuated; and
    a control including a first device to selectively actuate and deactuate the one of said conveyor sections that is the most downstream of said conveyor sections and a second device that is responsive to at least said first device in order to retract each said another retractor only when said first device is actuating said most downstream of said conveyor sections.

4. The accumulation conveyor in claim 3 wherein said second device is responsive to a selector device in order to extend each said another retractor when said selector device is actuated, and thereby place said other particular ones of said product sensors in a product sensing position.

5. The accumulation conveyor in claim 3 including a discharge product sensor associated with said most downstream of said conveyor sections, said discharge product sensor including a discharge sensor retractor that is responsive to said second device in order to retract said discharge retractor only when said first device is actuating said most downstream of said conveyor sections.

6. The accumulation conveyor in claim 5 wherein said second device is responsive to a selector in order to extend each said another retractor and said discharge sensor retractor whereby said other particular ones of said product sensors and said discharge product sensor will be in a product sensing position.

7. The accumulation conveyor in claim 3 wherein said conveyor sections are arranged into conveyor beds with a given number of contiguous conveyor sections in a bed and including at least one of said other particular ones of said product sensors with each of said conveyor beds.

8. The accumulation conveyor in claim 3 wherein said control is pneumatic.

9. An accumulation conveyor comprising:
    a plurality of conveyor sections arranged in tandem, each of said conveyor sections being selectively actuatable in order to convey product to another section and deactuatable in order to accumulate product on that section;
    a product sensor associated with each of said conveyor sections and having a sensing position in which that product sensor will sense the presence of product on the associated conveyor section to deactuate that conveyor section;
    particular ones of said product sensors each including a retractor that is responsive to actuation of at least the one of said conveyor sections that is downstream of the conveyor section associated with that sensor in order to retract that sensor from said sensing position;

other particular ones of said product sensors each including another retractor that is operative to retract that sensor from said sensing position irrespective of whether any conveyor section downstream of the conveyor section associated with that sensor is actuated; and a control for selecting one of a first, second and third mode, wherein in said first mode said control actuates the most downstream of said conveyor sections and actuates said other retractors in order to retract said other sensors from said sensing position, wherein in said second mode said control actuates the most downstream of said conveyor sections and does not actuate said other retractors whereby said other sensors will be in said sensing position, and wherein in said third mode said control deactuates said most downstream of said conveyor sections and does not actuate said other retractors whereby said other sensors will be in said sensing position.

10. The accumulation conveyor in claim 9 including a discharge product sensor associated with said most downstream of said conveyor sections, said discharge product sensor including a discharge sensor retractor that actuates said discharge retractor to retract said discharge product sensor from a sensing position when said control is in one of said second and third modes.

11. The accumulation conveyor in claim 9 wherein said conveyor sections are arranged into conveyor beds with a given number of contiguous conveyor sections in a bed and including at least one of said other particular ones of said product sensors with each of said conveyor beds.

12. The accumulation conveyor in claim 9 wherein said control is pneumatic.

13. An accumulation conveyor comprising:
a multiplicity of conveying rollers for supporting product and being rotatable for conveying said product, said rollers being grouped in adjacent zones;

an endless drive member juxtaposed with said rollers;

a pneumatic actuator associated with each of said zones that is actuatable by actuating fluid in order to bring said drive member into contact with the rollers in that zone to rotate the rollers in that zone to drive product;

a product sensor roller associated with each of said zones for sensing product in the vicinity of that zone;

a pneumatic control associated with each of said zones for supplying actuating fluid to the actuator of that zone to actuate that actuator if the product sensor roller for that zone does not sense the presence of product;

said pneumatic control further being responsive to actuation of the actuator of the zone downstream of that zone in order to supply actuating fluid to the actuator of that zone to actuate that actuator if any of said actuators downstream of that zone in the direction of product movement are actuated in order to produce a transport portion in which all zones upstream of any actuated actuators in the direction of product movement are actuated to transport product;

wherein said pneumatic control withholds actuating fluid from the actuator of that zone to deactuate that actuator if said product sensor roller for that zone senses the presence of product and all of said actuators downstream of that zone are deactuated in order to produce an accumulation portion in which no actuators are actuated; and wherein said pneumatic control includes a first pneumatic device that responds to said sensor roller for that zone not sensing the presence of product in order to connect the actuator of that zone with an actuating fluid manifold and a second pneumatic device that responds to actuation of the actuator of the zone downstream of that zone to connect the actuator of that zone with an actuating fluid manifold when the actuator of the zone downstream of that zone is actuated irrespective of whether said sensor roller for that zone is sensing the presence of product.

* * * * *

UNITED STATES PATENT AND TRADEMARK OFFICE
CERTIFICATE OF CORRECTION

PATENT NO. : 5,358,097
DATED : October 25, 1994
INVENTOR(S) : Douglas J. Bakkila, Samuel J. DeMan, David H. Cotter,
Bernard H. Woltier, Arthur J. Terpatra, Jr.

It is certified that error appears in the above-indentified patent and that said Letters Patent is hereby corrected as shown below:

Column 3, line 21, "line" should be --linkage--.
Column 6, line 67, "de,actuate" should be --deactuate--.
Column 8, line 24, After "84" delete "" - "".

Column 9, line 9:
"(>4" should be --64--.

Signed and Sealed this

Eighteenth Day of July, 1995

BRUCE LEHMAN

Attest:

Attesting Officer    Commissioner of Patents and Trademarks